Patented Jan. 9, 1951

2,537,908

UNITED STATES PATENT OFFICE 2,537,908

COMPOUNDED RUBBER STOCK

Alphonse Pechukas, Akron, Ohio, assignor to Pittsburgh Plate Glass Company, Allegheny County, Pa., a corporation of Pennsylvania No Drawing. Application July 30, 1946, Serial No. 687,224

16 Claims. (Cl. 260—33.4)

The present invention relates to compounded rubber stocks and more particularly to rubber stocks which contain pigmentary hydrated calcium silicate as the primary filler and reinforcing agent.

Finely divided hydrated calcium silicate has found general acceptance as a compounding pigment not only for natural rubber but also for those synthetic elastomeric compositions which have come to prominence in the past few years. The industry has established standards for pigmentary hydrated calcium silicate, which has been determined to impart optimum physical properties to rubber stocks compounded therewith. For example, the hydrated calcium silicate should have an average ultimate particle size of less than one micron and preferably not substantially in excess of 0.5 micron. Again the molecular ratio of $SiO_2$ to $CaO$ in the calcium silicate should be not less than 2 and preferably should be above 3. In a particularly effective pigment, this molecular ratio is 3.3. Hydrated calcium silicate failing to meet the expressed standards can and has been used in compounded rubber stocks. In such instances, however, the final products will not be the full equivalents of products compounded with hydrated calcium silicate possessing the specified properties.

Pigmentary hydrated calcium silicate is customarily prepared by precipitation from an aqueous solution of a soluble calcium salt, such as calcium chloride, on interaction therewith of a suitable, soluble alkali metal silicate. For example, the introduction of a sodium silicate solution, containing about 100 grams of $SiO_2$ per liter, into a concentrated solution of calcium chloride containing not less than 50 grams and preferably not less than 75 grams of the calcium chloride per liter, with vigorous agitation forms a suitable product. Other concentrations of reactants and modifications in procedural details will also enable the formation of a satisfactory pigment. The precipitated calcium silicate may be recovered by decantation or filtration and is dried at a temperature sufficiently high to remove any water which would otherwise be driven off during vulcanization, for example, about 150° C. or above. The dried product is very white and has an average particle size of less than 1 micron.

In many respects this finely divided hydrated calcium silicate has proven superior to other non-black pigments. When admixed with rubber stocks in relatively large percentages, there will be produced compositions which yield stiff, tough, hard vulcanizates possessing excellent abrasion resistance. Vulcanizates of rubber stocks containing smaller amounts of the hydrated calcium silicate are characterized by good tear resistance as well as excellent heat and ageing resistance. However, vulcanizates of synthetic elastomers, which have been compounded with large quantities of hydrated calcium silicate to afford maximum reinforcing properties therein, exhibit unsatisfactory hysteresis properties, as characterized by the heat build-up under dynamic tension. Natural rubber stocks containing hydrated calcium silicate frequently require longer curing times for adequate vulcanization than do natural rubber stocks processed with other pigmentary materials.

The effect of hydrated calcium silicate as an ingredient of compounded synthetic elastomeric stocks is readily demonstrated in connection with vulcanizates of GR–S, a synthetic rubber which is a copolymer containing 75% of butadiene-1,3 and 25% of styrene. Stocks of the following compositions were prepared and mixed by blending the several ingredients on a roll mill in a conventional manner:

| Rubber Stock | 1 | 2 | 3 |
|---|---|---|---|
| GR-S | 100.0 | 100.0 | 100.0 |
| Zinc Oxide | 5.0 | 5.0 | 5.0 |
| Pine Tar | 5.0 | | |
| Coal Tar Softener | 5.0 | | |
| Light Processing Oil | | 5.0 | 5.0 |
| Sulfur | 3.0 | 3.5 | 3.5 |
| N-Cyclo-hexyl-2-benzothiozole sulfonamide | 1.0 | | |
| Lead Dithiocarbamate | | 1.3 | 1.3 |
| Phenyl-beta-naphthylamine | 1.0 | 1.0 | 1.0 |
| Hydrated calcium silicate | 66.9 | 66.9 | 89.2 |

In these stocks, the amounts of the several ingredients are given as parts by weight. In stocks 1 and 2, the hydrated calcium silicate represents 30 volumes per 100 volumes of GR–S, while in stock 3, the hydrated calcium silicate constitutes 40 volumes per 100 volumes of GR–S.

Test vulcanizates of these stocks were produced by curing at 280° F. for varying lengths of time. The heat build-up in the vulcanizates was determined on a Goodrich flexometer, with an initial temperature of 100° F., a load of 175 pounds per square inch, and a stroke of 0.175 of an inch. The results of the tests are given in the following table, the heat build-up being reported as degrees rise in temperature above 100° F.

Table I

| Minutes of Flexing | Stock 1, Minutes Cure at 280° F. | | Stock 2, Minutes Cure at 280° F. | | | Stock 3, Minutes Cure at 280° F. | | |
|---|---|---|---|---|---|---|---|---|
| | 60 | 90 | 60 | 90 | 150 | 60 | 90 | 150 |
| | °F. | °F. | °F. | °F. | °F. | °F. | °F. | °F. |
| 3 | 64 | 49 | 116 | 85 | 59 | 143 | 115 | 81 |
| 6 | 87 | 76 | 131 | 124 | 87 | 147 | 140 | 120 |
| 12 | 112 | 96 | 137 | 129 | 100 | 164 | 147 | 128 |
| 20 | 125 | 104 | 151 | 132 | 102 | 173 | 150 | 128 |

The tabulated results indicate clearly the extra-ordinarily high heat build-up in a vulcanizate of a synthetic elastomer which has been compounded with hydrated calcium silicate. Similar effects have been noted in vulcanizates of other synthetic elastomers compounded with hydrated calcium silicate.

The utility of these vulcanizates is limited, for the high heat build-up precludes their use in any application where they would be subject to prolonged dynamic flexing. A limitation of this character, restricting the applicability of synthetic elastomers compounded with hydrated calcium silicate, is most undesirable. In an endeavor to obviate or at least to reduce the heat build-up, or otherwise to improve the hysteresis properties of these vulcanizates, modifications of the sulfur-accelerator ratios were attempted. These modifications were not successful for they were accompanied by undesirable changes in other physical properties of the vulcanizates. Similarly, the addition of plasticizing agents or compatible resinous materials was found to have deleterious effects upon the physical properties of the vulcanizates other than the heat build-up.

A principal object of my invention, therefore, is to provide an improved hydrated calcium silicate reinforced rubber stock which has acceptable hysteresis properties.

A second object of my invention is the provision of an improved hydrated calcium silicate reinforced rubber stock which exhibits generally benefited physical properties.

Other objects and advantages of my invention will become apparent from consideration of the following detailed description of certain preferred embodiments thereof.

I have found, and the present invention is based upon the discovery, that the admixture of small amounts of an alcohol with rubber stocks compounded with pigmentary hydrated calcium silicate produces compositions which yield vulcanizates having high moduli of elasticity, tensile strengths and hardness properties, as well as improved hysteresis properties.

In practicing the invention, rubber stocks are prepared in the customary manner by blending the several ingredients including hydrated calcium silicate upon a roll mill. Immediately prior to the removal of the compounded stock from the mill, from 2 to 10% by weight of an alcohol, based upon the amount of hydrated calcium silicate in the stock, is added thereto and incorporated therewith. In order to demonstrate the advantages of the invention a number of batches of rubber stock 2, hereinbefore identified, were prepared embodying various alcohols as additives. Test vulcanizates of these compositions were produced by curing at 280° F. for varying lengths of time. These vulcanizates were tested according to A. S. T. M. standard methods. The heat build-up in the vulcanizates was again determined on a Goodrich flexometer operating for 20 minutes on each sample under those conditions previously set forth. The results of the tests are given in the following table:

Table II

| Stock 2+Additive | Minutes Cure at 280° F. | Modulus at 300% | Tensile at Break | Per Cent Elongation at Break | Shore Hardness | Heat Build-up |
|---|---|---|---|---|---|---|
| None | 15 | 170 | 298 | 505 | 48 | |
| | 30 | 369 | 596 | 490 | 53 | |
| | 60 | 624 | 1,276 | 530 | 62 | 151 |
| | 90 | | | | | 132 |
| 4.2% Octyl Alcohol | 15 | 99 | 695 | 810 | 44 | |
| | 30 | 184 | 1,064 | 750 | 48 | |
| | 60 | 298 | 1,375 | 665 | 55 | 147 |
| | 90 | | | | | 138 |
| 5.2% 2 (2-butoxy ethoxy) ethanol | 15 | 241 | 978 | 690 | 50 | |
| | 30 | 312 | 1,262 | 670 | 53 | |
| | 60 | 425 | 1,390 | 560 | 57 | 109 |
| | 90 | | | | | 97 |
| 2.0% Ethylene Glycol | 15 | 539 | 1,064 | 485 | 59 | |
| | 30 | 766 | 1,475 | 480 | 61 | |
| | 60 | 1,049 | 1,461 | 380 | 66 | 94 |
| | 90 | 1,141 | 1,418 | 325 | 71 | 81 |
| 4.0% Ethylene Glycol | 15 | 610 | 1,276 | 525 | 62 | |
| | 30 | 1,021 | 1,631 | 475 | 67 | |
| | 60 | 1,234 | 1,687 | 465 | 73 | 84 |
| | 90 | 1,375 | 1,531 | 345 | 76 | 78 |
| 3.4% Diethylene Glycol | 15 | 837 | 1,503 | 460 | 65 | |
| | 30 | 1,049 | 1,475 | 405 | 66 | |
| | 60 | 1,290 | 1,546 | 350 | 69 | 73 |
| | 90 | 1,375 | 1,446 | 320 | 72 | 76 |
| 2.5% Propylene Glycol | 15 | 411 | 1,446 | 645 | 59 | |
| | 30 | 406 | 1,574 | 590 | 59 | |
| | 60 | 596 | 1,446 | 480 | 63 | 88 |
| | 90 | | | | | 85 |
| 3% Glycerol | 15 | 567 | 1,333 | 530 | | |
| | 30 | 808 | 1,645 | 475 | | |
| | 60 | 1,078 | 1,361 | 370 | | 90 |
| | 90 | 1,191 | 1,461 | 355 | | 85 |

In this table the moduli and tensiles are reported as pounds per square inch. The Shore hardness was determined with a Shore Type "A" durometer with a 2 pound dead weight load at 30 inches. The heat build-up is reported as degrees rise above 100° F.

These data illustrate clearly that the alcohols generally have beneficial effects upon the physical properties of vulcanizates of the synthetic elastomer, GR–S. It is also indicated that the polyhydroxy alcohols, or glycols, are particularly effective as additives to compounded synthetic elastomer stock.

Compositions based upon rubber stock 1, hereinbefore identified, and including 6% by weight of ethylene glycol, based upon the hydrated calcium silicate content, were prepared and samples thereof cured at 280° F. for varying lengths of time. These vulcanizates were tested under conditions identical with those previously described. The results of the test are given in the following table:

*Table III*

|  | Minutes Cure at 280° F. | Modulus at 300%, p. s. i. | Tensile at Break, p. s. i. | Per cent Elongation at Break | Shore Hardness | Heat Build-up |
|---|---|---|---|---|---|---|
| Stock 1; No glycol | 20 | 156 | 1177 | 745 | 51 | |
|  | 30 | 241 | 1191 | 665 | 55 | |
|  | 60 | 383 | 1092 | 515 | 60 | 125 |
|  | 90 | 411 | 1092 | 510 | 61 | 104 |
| Stock 1+6% of ethylene glycol | 10 | 227 | 1375 | 705 | 55 | |
|  | 15 | 369 | 1305 | 580 | 59 | |
|  | 30 | 425 | 1219 | 505 | 61 | |
|  | 60 | 482 | 1021 | 475 | 62 | 87 |
|  | 90 | 468 | 1149 | 485 | 62 | 78 |

The results herein again show the pronounced improvement in hysteresis properties occasioned by the inclusion of a polyhydroxy alcohol in a compounded rubber stock containing hydrated calcium silicate. The tests also indicate such modification to result in a faster rate of cure of the rubber stock. The tensile strength, indicative of the extent of cure, of the glycol containing stock after 10 minutes of cure is greater than the tensile strength of the unmodified stock after prolonged curing.

Improvements in the properties of vulcanizates of other compounded synthetic elastomers are also possible by inclusion in the stock of an alcohol. For example GR-I, a synthetic rubber which is a copolymer containing 97% of isobutylene and 3% of isoprene, compounded with hydrated calcium silicate, exhibits a faster rate of cure when ethylene glycol is also incorporated in the composition.

The following stocks were prepared by mixing on a standard mill, in which the parts are by weight:

| Stock | 4 | 5 |
|---|---|---|
| GR-I | 100.0 | 100.0 |
| Zinc Oxide | 5.0 | 5.0 |
| Sulfur | 2.0 | 2.0 |
| Tetramethyl Thiuram Disulfide | 1.0 | 1.0 |
| Mercaptobenzothiazole | 0.5 | 0.5 |
| Stearic Acid | 1.0 | 1.0 |
| Iron Oxide | 5.0 | 5.0 |
| Soft Clay | 50.0 | 50.0 |
| Hydrated Calcium Silicate | 30.0 | 30.0 |
| Ethylene glycol | | 1.8 |

Samples of these compositions were vulcanized at 316° F. for varying lengths of time, and tested under conditions identical with those used for the previously described tests. The moduli and tensiles are reported as pounds per square inch. The tear resistance is reported as pounds per 0.1 inch thickness. The results of the tests are given in the following table:

*Table IV*

|  | Minutes Cure at 316° F. | Modulus at 300% | Tensile at Break | Percent Elongation at Break | Shore Hardness | Tear |
|---|---|---|---|---|---|---|
| Stock 4 | 5 | 355 | 936 | 630 | 42 | 12 |
|  | 7.5 | 397 | 1,191 | 660 | 49 | 14 |
|  | 10 | 440 | 1,276 | 655 | 51 | 15 |
|  | 15 | 440 | 1,418 | 655 | 55 | 13 |
|  | 20 | 482 | 1,517 | 640 | 57 | 14 |
| Stock 5 | 5 | 241 | 1,432 | 755 | 46 | 15 |
|  | 7.5 | 255 | 1,475 | 720 | 48 | 14 |
|  | 10 | 284 | 1,560 | 705 | 50 | 13 |
|  | 15 | 269 | 1,631 | 680 | 50 | 10 |
|  | 20 | 312 | 1,617 | 650 | 54 | 11 |

The results illustrate that the inclusion of ethylene glycol in an amount equal to 6% by weight of the amount of hydrated calcium silicate in a compounded GR-I stock approximately doubles the rate of cure of that stock. The hysteresis properties of the isobutylene-isoprene copolymer are seemingly unaffected by the admixture therewith of hydrated calcium silicate.

In another embodiment of the invention, illustrating the further applicability of the principles herein involved, the following compositions based upon neoprene, a polymer of chloroprene, were prepared, in which the parts are by weight:

| Stock | 6 | 7 |
|---|---|---|
| Neoprene | 100.0 | 100.0 |
| Calcined Magnesia | 4.0 | 4.0 |
| Zinc Oxide | 5.0 | 5.0 |
| Sodium Acetate | 1.0 | 1.0 |
| Phenyl-beta-naphthylamine | 3.0 | 3.0 |
| Stearic Acid | 3.0 | 3.0 |
| Petrolatum | 1.0 | 1.0 |
| Light Processing Oil | 10.0 | 10.0 |
| Di-ortho-tolylguanidine salt of Dicatechol Borate | 1.0 | 1.0 |
| Hydrated Calcium Silicate | 60.0 | 60.0 |
| Ethylene Glycol | | 3.0 |

Samples of these compositions were vulcanized at 307° F. for 120 minutes and tested. The results are given in the following table:

*Table V*

| Stock | Modulus at 300% | Tensile at Break | Per cent Elongation at Break | Shore Hardness | Tear |
|---|---|---|---|---|---|
| 6 | 652 | 1617 | 635 | 65 | 24 |
| 7 | 865 | 1588 | 580 | 80 | 28 |

These tests show the addition of 5% of ethylene glycol to compounded neoprene increases the hardness and tear resistance of vulcanizates thereof.

Natural rubber stocks containing the following ingredients, in parts by weight, were prepared:

| Stock | 8 | 9 | 10 | 11 |
|---|---|---|---|---|
| Rubber | 100.0 | 100.0 | 100.0 | 100.0 |
| Zinc Oxide | 5.0 | 5.0 | 5.0 | 5.0 |
| Sulfur | 2.5 | 2.5 | 2.5 | 2.5 |
| Stearic Acid | 1.0 | 1.0 | 1.0 | 1.0 |
| Benzothiazyl Disulfide | 1.25 | 1.25 | 1.25 | 1.25 |
| Hydrated Calcium Silicate | 45.6 | 45.6 | 91.2 | 91.2 |
| Ethylene Glycol | | 2.7 | | 5.5 |

Samples of these compositions were cured at 287° F. for varying lengths of time and the vulcanizates were tested as in the preceding examples. The results of the tests are given in the following table:

*Table VI*

| Stock | Minutes Cure at 287° F. | Modulus at 300 Per Cent | Tensile at Break | Per Cent Elongation at Break | Shore Hardness | Tear |
|---|---|---|---|---|---|---|
| 8 | 5 | 383 | 1,886 | 700 | 45 | 10 |
|   | 10 | 539 | 2,949 | 680 | 45 | 9 |
|   | 20 | 553 | 2,949 | 690 | 46 | 15 |
|   | 30 | 482 | 3,006 | 730 | 46 | 17 |
|   | 45 | 454 | 2,708 | 750 | 47 | 20 |
| 9 | 5 | 638 | 3,347 | 655 | 49 | 38 |
|   | 10 | 681 | 3,474 | 665 | 51 | 41 |
|   | 20 | 709 | 3,318 | 680 | 52 | 37 |
|   | 30 | 610 | 3,205 | 690 | 52 | 35 |
|   | 45 | 596 | 2,893 | 675 | 53 | 29 |
| 10 | 5 | 1,588 | 2,864 | 485 | 62 | 15 |
|   | 10 | 1,617 | 2,779 | 485 | 63 | 18 |
|   | 20 | 1,475 | 2,751 | 510 | 64 | 26 |
|   | 30 | 1,390 | 2,773 | 545 | 64 | 27 |
|   | 45 | 1,290 | 2,666 | 580 | 65 | 31 |
| 11 | 5 | 1,418 | 2,694 | 500 | 84 | 41 |
|   | 10 | 1,446 | 2,765 | 510 | 85 | 42 |
|   | 20 | 1,333 | 2,708 | 535 | 86 | 39 |
|   | 30 | 1,319 | 2,496 | 505 | 86 | 37 |
|   | 45 | 1,347 | 2,737 | 510 | 87 | 33 |

It is apparent from these data that natural rubber vulcanizates of increased tensile strengths result from the inclusion of ethylene glycol in the compounded rubber stocks. Similarly improvements in the hardness and tear resistance of these vulcanizates can be noted. The reported decrease in tensile strengths following extended vulcanization is typical of overcured natural rubber.

The present invention has been described with particular reference to certain typical rubber stocks, both synthetic and natural. Similar advantages will be achieved through compounding other types of rubber stocks with hydrated calcium silicate and an alcohol. For example, synthetic elastomers made by the polymerization of butadiene-1,3, isoprene, piperylene, 2,3-dimethyl butadiene, 2-chlorobutadiene, or other comparable polymerizable compound alone or in admixture with one or more organic monomeric ethylenic compound, including acrylonitrile, isobutylene, vinyl chloride, styrene, methyl methacrylate, and the like, yield vulcanizates of improved properties when compounded stocks thereof include an alcohol. In addition, various compounding and vulcanizing ingredients generally employed for special batches, including carbon black, calcium carbonate, aluminum hydrate, accelerators, antioxidants and the like may be included in the compositions herein described. In this connection, I have observed that the inclusion of an alcohol, and preferably a polyhydroxy alcohol, in a rubber stock compounded with pigments other than hydrated calcium silicate imparts certain improvement to that stock. The effects of an alcohol addition, however, are most pronounced in those stocks compounded with hydrated calcium silicate.

The proportions of the alcohol which is incorporated with the rubber stock varies considerably depending to a large extent upon the nature of the basic rubber in the stock and the physical properties of vulcanizates of the stock. In general, optimum results over the entire field of physical properties follow the addition of from 2 to 10% by weight of alcohol, based upon the hydrated calcium silicate content, to the compounded rubber stock. More specifically, I prefer to employ 6% by weight of the alcohol, based upon the hydrated calcium silicate content in the compounded stocks.

Other modifications and variations will be apparent to those skilled in the art and are possible without departing from the spirit and scope of my invention as defined in the appended claims.

What I claim is:

1. A composition comprising an elastomer of butadiene and styrene, from 30 to 100% by weight based on said copolymer of pigmentary hydrated calcium silicate, and from 2-10% by weight based on said calcium silicate of ethylene glycol.

2. A composition comprising a copolymer of butadiene and styrene, approximately 60% by weight based on said copolymer of pigmentary hydrated calcium silicate, and about 6% by weight based on said calcium silicate of ethylene glycol.

3. A composition comprising a copolymer of butadiene and styrene, from 40 to 100% by weight based on said copolymer of pigmentary hydrated calcium silicate, and from 2-10% by weight based on said calcium silicate of propylene glycol.

4. A composition comprising a copolymer of butadiene and styrene, from 40 to 100% by weight based on said copolymer of pigmentary hydrated calcium silicate, and from 2-10% by weight based on said calcium silicate of glycerol.

5. A method of preparing a composition comprising a rubber of the group consisting of natural rubber and polymers of butadiene-1,3, isoprene, piperylene, 2,3-dimethyl butadiene, and 2-chlorobutadiene, which comprises milling the rubber with at least 30% by weight of finely divided hydrated calcium silicate based on said rubber and at least 2% by weight of an alcohol based on the weight of said hydrated calcium silicate and vulcanizing the resulting composition.

6. The method as described in claim 5 in which the amount of pigmentary hydrated calcium silicate is from 30% to 100% by weight based on the rubber and the amount of alcohol is from 2 to 10% by weight based on the pigmentary hydrated calcium silicate.

7. A composition which comprises (1) an unvulcanized rubber of the group consisting of natural rubber and polymers of butadiene-1,3, isoprene, piperylene, 2,3-dimethyl butadiene, and 2-chlorobutadiene, (2) 30 to 100% by weight of calcium silicate based upon the weight of said rubber, and (3) a substantial effective amount up to 10% by weight of ethylene glycol, based upon the weight of calcium silicate in the composition.

8. A composition which comprises (1) an unvulcanized rubber of the group consisting of natural rubber and polymers of butadiene-1,3, isoprene, piperylene, 2,3-dimethyl butadiene, and 2-chlorobutadiene, (2) 30 to 100% by weight of calcium silicate based upon the weight of said rubber, and (3) a substantial effective amount up to 10% of a polyhydric alcohol of the group consisting of ethylene glycol, propylene glycol, diethylene glycol, and glycerol, based upon the calcium silicate in the composition.

9. A composition which comprises an unvulcanized butadiene-styrene copolymer, 30 to 100% by weight of calcium silicate based upon the weight of said copolymer, and a substantial amount up to 10% by weight of a polyhydric alcohol of the group consisting of ethylene glycol, propylene glycol, diethylene glycol, and glycerol based upon the calcium silicate in the composition.

10. A vulcanizate of a composition as defined in claim 7.

11. A vulcanizate of a composition as defined in claim 8.

12. A composition as defined in claim 8 wherein the rubber is natural rubber.

13. A vulcanizate of a composition as defined in claim 12.

14. A composition comprising an unvulcanized rubber of the group consisting of natural rubber and polymers of butadiene-1,3, isoprene, piperylene, 2,3-dimethylbutadiene, and 2-chlorobutadiene, 30 to 100% by weight of calcium silicate based upon the weight of said rubber, and 2 to 10% of an alcohol based upon the calcium silicate in the composition.

15. The composition of claim 14 wherein the alcohol is a polyhydric alcohol, a member of the group consisting of ethylene glycol, propylene glycol, diethylene glycol and glycerol.

16. The vulcanizate of a composition as defined in claim 14.

ALPHONSE PECHUKAS.

REFERENCES CITED

The following references are of record in the file of this patent:

UNITED STATES PATENTS

| Number | Name | Date |
|---|---|---|
| 2,015,234 | Rodman | Sept. 24, 1935 |
| 2,334,526 | Allison | Nov. 16, 1943 |
| 2,391,281 | Thompson | Dec. 18, 1945 |
| 2,429,439 | Westfahl et al. | Oct. 21, 1947 |
| 2,433,849 | Lathrop et al. | Jan. 6, 1948 |

FOREIGN PATENTS

| Number | Country | Date |
|---|---|---|
| 115,583 | Australia | Aug. 6, 1942 |

OTHER REFERENCES

"Industrial and Engineering Chemistry" by Fisher, August 1939, pages 941-942.

Rubber Age, Sept. 1945, page 732.